United States Patent [19]

DuBois

[11] Patent Number: 5,387,294
[45] Date of Patent: * Feb. 7, 1995

[54] HARD SURFACING ALLOY WITH PRECIPITATED METAL CARBIDES AND PROCESS

[75] Inventor: Samuel C. DuBois, Troy, Mich.

[73] Assignee: Wall Comonoy Corporation, Madison Heights, Mich.

[*] Notice: The portion of the term of this patent subsequent to Aug. 25, 2009 has been disclaimed.

[21] Appl. No.: 886,044

[22] Filed: May 19, 1992

Related U.S. Application Data

[63] Continuation of Ser. No. 696,836, May 7, 1991, Pat. No. 5,141,571.

[51] Int. Cl.6 .......................... C22C 19/05; C22C 32/00
[52] U.S. Cl. ..................................... 148/427; 148/442; 420/442; 75/352; 75/355; 75/238; 75/241; 75/242; 428/680
[58] Field of Search ................. 148/427, 442; 420/442, 420/588, 584, 453; 75/352, 355, 238, 240, 241, 242; 428/680

[56] References Cited

U.S. PATENT DOCUMENTS

| | | | |
|---|---|---|---|
| 2,458,502 | 1/1949 | Cape | 420/453 |
| 3,836,341 | 9/1974 | Saltzman et al. | 29/191.6 |
| 4,231,793 | 11/1980 | Kruske et al. | 75/122 |
| 4,556,607 | 12/1985 | Sastri | 148/427 |
| 4,731,253 | 3/1988 | DuBois | 427/34 |
| 5,141,571 | 8/1992 | DuBois | 148/427 |

FOREIGN PATENT DOCUMENTS

| | | | |
|---|---|---|---|
| 55-82737 | 6/1980 | Japan | 420/442 |
| 57-185946 | 11/1982 | Japan | 148/442 |

OTHER PUBLICATIONS

COLMONOY© Technical Data Sheet, Wall Colmonoy Corporation, 1988 (4 pages).

Primary Examiner—Richard O. Dean
Assistant Examiner—Sikyin Ip
Attorney, Agent, or Firm—Harness, Dickey & Pierce

[57] ABSTRACT

A hard surfacing alloy which has a Rockwell C hardness of greater than about 50 and which includes tungsten carbide, chromium carbide and bi-metallic chromium and tungsten carbide crystals which are precipitated in the alloy. Alloys of the present invention in their nominal composition comprise from about 12% to about 20% tungsten; from about 13% to about 30% chromium; an effective amount of carbon for forming carbides with the tungsten and chromium and include effective amounts of fluxes and melting point depressants and the like. The balance of the composition is nickel. The alloys include precipitated carbide crystals of chromium, tungsten and bi-metallic mixtures thereof which are interspersed through the hard surfacing alloy and are metallurgically bonded in the metal matrix of the alloy. The alloys have extremely low porosities and therefore are suitable for glass plunger and other applications where low porosity is essential.

8 Claims, 1 Drawing Sheet

HARD SURFACING ALLOY WITH PRECIPITATED METAL CARBIDES AND PROCESS

This is a continuation application Ser. No. 07/696,836, filed May 7, 1991, U.S. Pat. No. 5,141,571.

BACKGROUND

The present invention relates to high temperature corrosion resistant hard surfacing alloys which are of extremely high hardness. More particularly, the present invention relates to hard surfacing alloys which contain tungsten carbide, chromium carbide and bi-metallic tungsten chromium carbide precipitates which are precipitated in the alloy and are thus bound in the hard surfacing alloy. Alloys of the present invention produce superior surfaces for improved wear in high temperature high corrosive environments such as glass mould plungers and the like.

Plungers used in glass moulding are exposed to some of the most extreme and corrosive environments which are found in modern industry. These plungers are subjected to hundreds of thousands of high impact high temperature plunging operations in the glass moulding industry. In the past, these plungers have been a source of down time in that they are subject to rapid wear. Also, plungers used in the glass mould industry must have surfaces be of very low porosity to provide the proper surface in the final finished glass piece. Thus, improper wearing of plunger surfaces mandates repair or replacement. Prior alloys used for surfacing of glass mould plungers have demonstrated "hot wiping" of the alloys from the glass plunger surface. This condition reduced longevity in that the surface alloy was worn away creating out of specification conditions requiring replacement and/or repair.

It has been known that if hard surfacing alloys could be achieved which have high Rockwell C hardnesses or greater than 50, such an alloy would greatly increase longevity of these plungers. However, such alloys have not been readily available in the prior art.

Because of such high Rockwell C hardness requirements it has been generally recognized that materials containing carbides such as tungsten carbides and the like would be advantageous in such alloys.

In other applications, high hardness alloys have been successfully utilized using sintered cobalt structures employing tungsten carbide particles which are encapsulated therein. These cobalt sintered structures rely on the encapsulation of tungsten carbide particles in the alloy to produce high hardness type alloys in the ranges necessary for glass mould plungers. Such alloys are known and have been used in other applications, however, when these alloys are used in glass plunger applications it was found that the final plunger produced by such an alloy was not suitable for a glass plunger application due to the porosity of the alloy produced. Such porosity is undesirable as stated above. Additionally, because of the extreme working conditions in glass plunger applications extraordinary quantities of tungsten carbides would need to be utilized. The sintered type structures have not been found to readily accommodate such high quantities of tungsten carbides.

Sintered structures also are prone to loss of the critical tungsten carbide particles under use, apparently due to the relatively "loose" encapsulation of tungsten carbides in the structure. Thus, as these structures wear the tungsten carbide particles tend to dislodge from the structure reducing the hardness of the structure.

Thus, it has been a goal in the art to provide a high hardness surfacing alloy which contains high quantities of tungsten carbide particles and the like and which has low porosity characteristics.

SUMMARY OF THE INVENTION

In accordance with these goals there is provided in the present invention a hard surfacing alloy which has a Rockwell C hardness of greater than about 50 and which includes tungsten carbide, chromium carbide and bi-metallic chromium and tungsten carbide crystals which are precipitated in the alloy. Alloys of the present invention in their nominal composition comprise from about 12% to about 20% tungsten; from about 13% to about 30% chromium; an effective amount of carbon for forming carbides with the tungsten and chromium and effective amounts of fluxes and melting point depressants and the like. The balance of the composition is nickel. Alloys of the present invention include precipitated carbide crystals of chromium, tungsten and bi-metallic mixtures thereof which are interspersed through the hard surfacing alloy and are metallurgically bonded in the metal matrix of the alloy. Alloys in accordance with the present invention have extremely low porosities and therefore are suitable for glass plunger and other applications where low porosity is essential. Also, because these alloys have precipitated metal carbides which are bound in the structure there is less occurrence of the carbide crystals coming loose in the hard surfacing alloys of the present invention.

DESCRIPTION OF THE PREFERRED EMBODIMENTS

Hard surfacing alloys in accordance with the present invention typically have a Rockwell C hardness in a range of from about 50 to about 70 and preferably from about 58 to 65. In nominal composition these alloys include from about 12% to about 20% tungsten and preferably 15% to about 18% tungsten; from about 13% to about 30% chromium and preferably from about 14% to 18% chromium; and an effective amount of carbon with the balance being nickel. Also incorporated in the present invention are suitable fluxes and melting point depressants to provide an effective hard surfacing alloy. For instance, preferred compositions of the present invention include boron, silicon and iron in ranges of from about 2% to about 5%. Preferably, iron is used in ranges of from about 3% to about 4%, boron is used in ranges from about 2% to about 4% and the silicon from about 3.5% to about 50%. Effective amounts of carbon in the present invention include carbon in ranges of from about 0.5% to about 1%.

Figure 1:
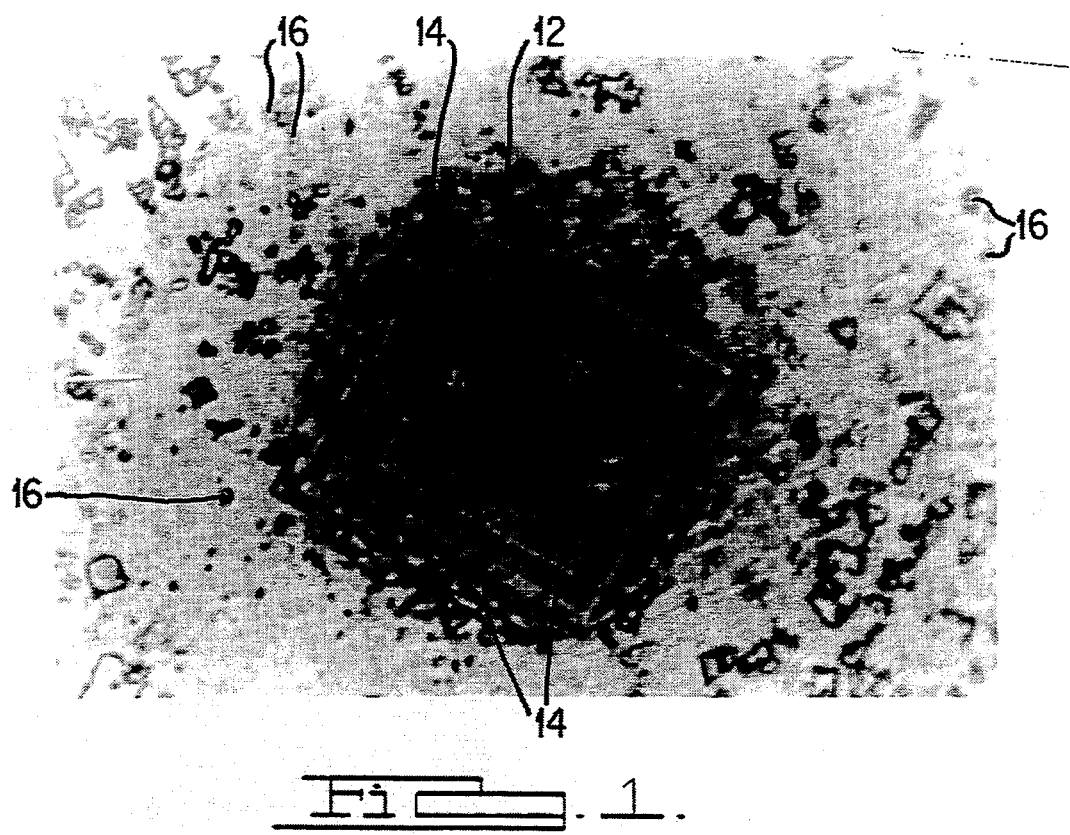
FIG. 1 is a photomicrograph taken at a magnification of X 1880, of an alloy made in accordance with the teachings of the present invention, showing the bi-metallic crystalline particle and the distribution of tungsten carbides and chromium carbides in the alloy.

Referring now to FIG. 1, critical in the present invention are the existence of precipitated tungsten carbide crystals, chromium carbide crystals, and bi-metallic tungsten/chromium carbide crystals. Referring now to FIG. 1, these crystals may be best identified by size and shapes therein. For instance, the larger rectangular shaped crystal 12 is the bi-metallic chromium and tungsten carbide crystal. The bi-metallic tungsten and chromium carbide crystal 12 is typical of the present invention and also includes a number of chromium carbide precipitate crystals 14 therein which are of a smaller magnitude than the larger particles 12 and have a characteristic hexagonal shape. Tungsten carbide precipitate crystals 16 which are interspersed throughout the remainder of the metal are the smallest of the crystalline constituents.

The larger bi-metallic particles 12 typically are from about 25 to 100 microns across with preferable sizes being in the 40 to 50 micron range. These bi-metallic particles have hardnesses of about 2050 on the vickers hardness scale.

The smaller chromium carbide particles 14 and tungsten carbide crystals 16 range in size from about 1 to about 10 microns with the chromium carbide crystals being at the larger end of that range and the tungsten carbide crystals at the smaller end of that range. The tungsten carbides have hardnesses of about 2400 and the chromium carbides of about 1600 on the vickers hardness scale. In preferred compositions of the present invention the chemistry and temperature of the melt time may be controlled for precipitation of these crystals such that from about 10% to about 15% of the surface area of the alloy is populated with the larger bi-metallic tungsten and chromium carbide crystals 12 and approximately from about 35% to 50% of the total composition is tungsten carbide and chromium carbide type precipitates.

Figure 2:
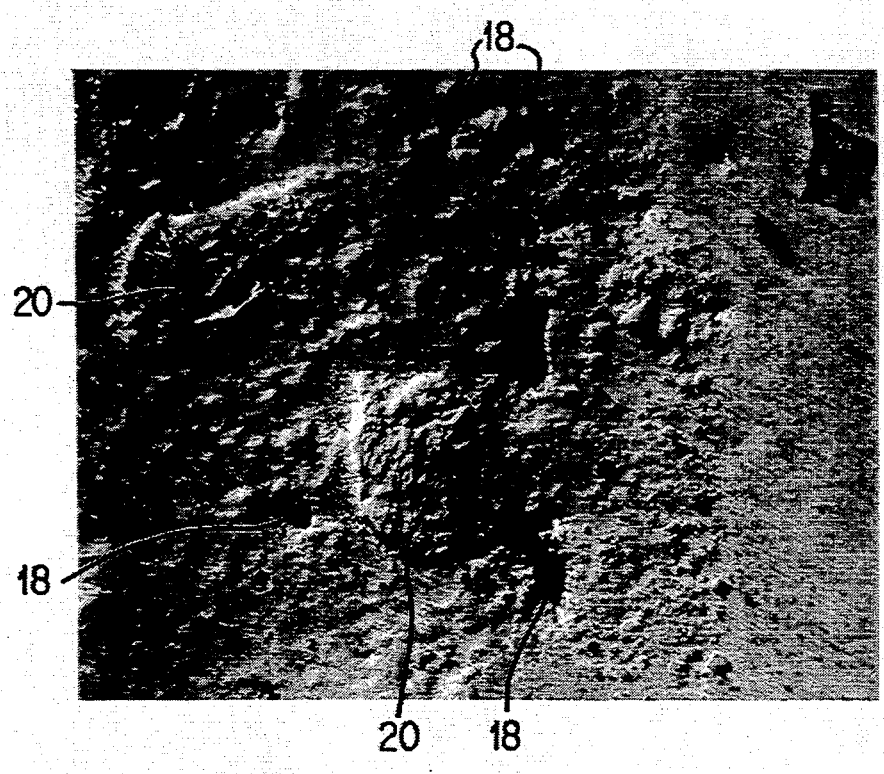
FIG. 2 is a photomicrograph taken at magnification of X 2520 which shows a typical sintered tungsten structure illustrating the undesirable porosity of prior art structures.

It is critical in the present invention that these carbide crystals are precipitated in the alloy such that they are metallurgically bonded in the alloy and provide a much smoother low porosity surface than the prior art shown in FIG. 2. Thus, the present invention has low porosity ranges such that no porosity is visible at a magnification of at least times 10. As shown in FIG. 2, the porosity of the prior art sintered tungsten carbide structure is readily notable. In this structure blackened areas 18 indicate the existence of unacceptable porosity and also the tungsten carbide containing areas 20 are very coarse in nature. In contrast, FIG. 1, which depicts the alloy of the present invention, has no visible porosity, even at the X 1880 magnification. Thus, hard surfacing alloy compositions of the present invention are extremely well suited for low porosity type applications.

When alloys of the present invention are applied to glass plunger parts it has been found that substantially no "hot wiping" occurs on plungers up to the useful life of prior art type plungers (approximately 635,000 bottles) and beyond. Glass plungers utilizing alloys in accordance with the present invention have found to stay hard up to and above 1850° F. Alloys of the present invention are substantially free from softening or corrosion at these temperatures and have very good abrasion resistance even under the extreme conditions of glass moulding operations.

In accordance with the process aspects the constituents in the ranges set forth above must be alloyed together in a melt and heated at a temperature of greater than about 2250° F. and preferably of from about 2800° F. to 3200° F. to provide the necessary conditions for carbide formation. Alloys of the present invention are viscous even at these melt temperatures having the consistency of honey. In a preferred embodiment the melt is processed through a rapid solidification nozzle with the resulting powder including the precipitated tungsten chromium and bi-metallic carbide particles.

Typically, powders of the present invention have sizes of from about 140 to about 400 mesh and preferably 170 to about 325 mesh. These powders are formed by heating the constituents of the present invention at high temperatures of from about 2,500° F. to 3,000° F. and using a Krupp 4a or other type rapid solidification nozzle to rapidly solidify these particles from this temperature which produces the precipitation carbide products. Such conditions with the presence of high concentrations of the chromium, carbon and tungsten constituents facilitates the formation of the bi-metallic tungsten and chromium carbide crystals of the present invention.

In a preferred embodiment of the process of the present invention, the nickel constituent is utilized in the form of a pure pelletized nickel and can be obtained from INCO International Company of Saddle Brook, N.J. The nickel is initially melted in a furnace utilizing about ⅓ of the amount of weighed nickel boron. Thus, a portion of the nickel concentration comes from the addition of nickel boron which can be obtained through Shield Alloy Corporation of South Holland, Ill. or SKW Metals & Alloys of Niagara Falls, N.Y. The boron constituent of the present invention acts as a melting point depressant, hardening agent and a flux in the alloys of the present invention. After melting this initial charge completely the entire amount of tungsten is added to the melt and completely dissolved. Thereafter, the remaining elements are added and dissolved with the constituent being added immediately prior to atomization.

Iron is provided for improving ductility of the final alloy. Thus, improving the impact resistance of the alloy. Whereas the silicon acts to depress the melting point of the present alloy and adds oxidation resistance to the alloy. Pure silicon such as that obtained from Elkem Metals Company of Marietta, Ohio may be utilized in the present invention. For processing into a powder form the silicon constituent is added immediately prior to atomization.

Further understanding of the present invention will be had from the following examples which are given herein for purposes of illustration but not limitation.

EXAMPLE I

In the present example the weights of constituents and aimed for percentages are set forth below in Table I.

TABLE I

| | Aim Percent | Weight (lbs.) | & (gms) |
|---|---|---|---|
| Boron[1] | 2.50% | 1.430 lbs. | 649 gms. |
| Carbon[2] | 0.65% | 0.065 lbs. | 30 gms. |
| Chromium[3] | 14.00% | 1.400 lbs. | 636 gms. |
| Iron[4] | 3.00% | 0.300 lbs. | 136 gms. |
| Silicon[5] | 3.50% | 0.350 lbs. | 159 gms. |
| Tungsten[6] | 16.00% | 1.600 lbs. | 726 gms. |

TABLE I-continued

| Aim Percent | | Weight (lbs.) & (gms.) | |
|---|---|---|---|
| Nickel[7] | 60.35% | 4.855 lbs. | 2294 gms. |

[1] Source of boron is nickel boron usually containing approximately 17.50% boron obtained from ShieldAlloy Corporation of South Holland, Illinois.
[2] The nickel contained in nickel boron is already subtracted from the amount of pure nickel obtained from INCO International Company of Saddle Brook, New Jersey.
[3] Carbon (graphite flake) obtained from Cummingsmoore Graphite, Company of Detroit, Michigan.
[4] Aluminothermic grade chromium obtained from ShieldAlloy Corporation of South Holland, Illinois.
[5] Pure Iron obtained from Armco Steel Corporation of Middletown, Ohio.
[6] Pure silicon obtained from Elkem Metals Company of Marietta, Ohio.
[7] Pure tungsten obtained from Kaichen's Metal Mart of Paramount, California.

A 10 pound melt of the alloy was prepared in accordance with the following procedure. The entire amount of nickel and ⅓ of the amount of nickel boron was placed in a zirconium oxide crucible in an INDUCTOTHERM® induction melt furnace and heated to a temperature of about 2500° F. The temperature was maintained until complete melting of the nickel and nickel boron occurred. Thereafter, the entire quantity of tungsten was added and allowed to dissolve into the melt for about 20 minutes, until completely dissolved in the melt. Thereafter, the remainder of the constituents were added, with the exception of silicon, and allowed to melt completely. The silicon was then added to the melt. With the temperature increased to about 2800° F. to prepare for atomization, a Krupp type 4a nozzle with a gap of 0.015" was used at a nozzle pressure of about 500 psi to produce a 325 mesh powder. The resulting alloy was found to contain bi-metallic carbide, tungsten carbide and chromium carbide crystals throughout.

A Wall Colmonoy SPRAYWELDER ™ type thermal spray applicator is used to hard surface a glass mold plunger. The resulting hard surface coating is found to be very low in porosity and is resistant to hot wiping in a glass moulding manufacturing operation.

EXAMPLE II

In the present example the weights of constituents and aimed for percentages are set forth below in Table II.

TABLE II

| Aim Percent | | Weight (lbs.) & (gms.) | |
|---|---|---|---|
| Boron[1] | 3.50% | 2.040 lbs. | 925 gms. |
| Carbon[2] | 0.95% | 0.095 lbs. | 43 gms. |
| Chromium[3] | 18.00% | 1.800 lbs. | 817 gms. |
| Iron[4] | 4.00% | 0.400 lbs. | 182 gms. |
| Silicon[5] | 5.00% | 0.500 lbs. | 227 gms. |
| Tungsten[6] | 18.00% | 1.800 lbs. | 817 gms. |
| Nickel[7] | 50.55% | 3.365 lbs. | 1528 gms. |

[1] Source of boron is nickel boron usually containing approximately 17.50% boron obtained from ShieldAlloy Corporation of South Holland, Illinois.
[2] The nickel contained in nickel boron is already subtracted from the amount of pure nickel obtained from INCO International Company of Saddle Brook, New Jersey.
[3] Carbon (gaphite flake) in the obtained from Cummingsmoore Graphite, Company of Detroit, Michigan.
[4] Aluminothermic grade chromium Shieldalloy of South Holland, Illinois.
[5] Pure Iron obtained from Armco Steel Corporation of Middletown, Ohio.
[6] Pure silicon obtained from Elkem Metals Company, Marietta, Ohio.
[7] Pure tungsten obtained from Kaichen's Metal Mart of Paramount, California.

A 10 pound melt of the alloy was prepared in accordance with the following procedure. The entire amount of nickel and ⅓ of the amount of nickel boron was placed in a zirconium oxide crucible in an INDUCTOTHERM® induction melt furnace and heated to a temperature of about 2500° F. The temperature was maintained until complete melting of the nickel and nickel boron occurred. Thereafter, the entire quantity of tungsten was added and allowed to dissolve into the melt for about 20 minutes, until completely dissolved in the melt. Thereafter, the remainder of the constituents were added, with the exception of silicon, and allowed to melt completely. The silicon was then added to the melt. With the temperature increased to about 2800° F. to prepare for atomization, a Krupp type 4a nozzle with a gap of 0.015" was used at a nozzle pressure of about 500 psi to produce a 325 mesh powder. The resulting alloy was found to contain bi-metallic carbide, tungsten carbide and chromium carbide crystals throughout.

A Wall Colmonoy SPRAYWELDER ™ type thermal spray applicator is used to hard surface a glass mold plunger. The resulting hard surface coating was found to be very low in porosity and is resistant to hot wiping in a glass moulding manufacturing operation.

EXAMPLE III

In the present example the weights of constituents and aimed for percentages are set forth below.

TABLE III

| Aim Percent | | Weight (lbs.) & (gms.) | |
|---|---|---|---|
| Boron[1] | 3.00% | 1.750 lbs. | 793 gms. |
| Carbon[2] | 0.80% | 0.080 lbs. | 36 gms. |
| Chromium[3] | 15.00% | 1.500 lbs. | 681 gms. |
| Iron[4] | 3.50% | 0.350 lbs. | 159 gms |
| Silicon[5] | 4.00% | 0.400 lbs. | 182 gms. |
| Tungsten[6] | 17.25% | 1.725 lbs. | 783 gms. |
| Nickel[7] | 56.45% | 4.195 lbs. | 1.905 gms. |

[1] Source of boron is nickel boron usually containing approximately 17.50% boron obtained from ShieldAlloy Corporation of South Holland, Illinois.
[2] The nickel contained in nickel boron is already subtracted from the amount of pure nickel obtained from INCO International Company of Saddle Brook, New Jersey.
[3] Carbon (graphite flake) obtained from Cummingsmoore Graphite, Company of Detroit, Michigan.
[4] Aluminothermic grade chromium obtained from ShieldAlloy Corporation of South Holland, Illinois.
[5] Pure Iron obtained from Armco Steel Corporation of Middletown, Ohio
[6] Pure silicon obtained from Elkem Metals Company of Marietta, Ohio.
[7] Pure tungsten obtained from Kaichen's Metal Mart of Paramount, California.

A 10 pound melt of the alloy was prepared in accordance with the following procedure. The entire amount of nickel and ⅓ of the amount of nickel boron was placed in a zirconium oxide crucible in an INDUCTOTHERM® induction melt furnace and heated to a temperature of about 2500° F. The temperature was maintained until complete melting of the nickel and nickel boron occurred. Thereafter, the entire quantity of tungsten was added and allowed to dissolve into the melt for about 20 minutes, until completely dissolved in the melt. Thereafter, the remainder of the constituents were added, with the exception of silicon, and allowed to melt completely. The silicon was then added to the melt. With the temperature increased to about 2800° F. to prepare for atomization, a Krupp type 4a nozzle with a gap of 0.015" was used at a nozzle pressure of about 500 psi to produce a 325 mesh powder. The resulting alloy was found to contain bi-metallic carbide, tungsten carbide and chromium carbide crystals throughout.

A Wall Colmonoy SPRAYWELDER ™ type thermal spray applicator is used to hard surface a glass mold plunger. The resulting hard surface coating was found to be very low in porosity and is resistant to hot wiping in a glass moulding manufacturing operation. The alloy was found to have a hardness of about 64 on the Rockwell C scale.

EXAMPLE IV

Hard surfacing alloys are prepared in accordance with the procedure of Example III utilizing: in a first alloy 12% tungsten, 30% chromium, 2% boron, 2% iron, 2% silicon and 0.5% carbon, balance nickel; and in a second alloy 20% tungsten, 13% chromium, 5% boron, 5% iron, 5% silicon, 1% carbon and the balance nickel. The resulting powders include tungsten carbide, chromium carbide and bi-metallic tungsten and chromium carbide crystals metallurgically bound therein.

A first glass mould plunger is hard surfaced with the first alloy. A second glass mould plunger is hard surfaced with the second alloy. The resulting surface of both glass mould plungers is found to have a hardness of greater than 50 and are low in porosity.

While the above description constitutes the preferred embodiments of the present invention it is to be appreciated that the invention is susceptible to modification, variation and change without departing from the proper scope and fair meaning of the accompanying claims.

What is claimed is:

1. A hard surfacing alloy having a Rockwell C hardness of greater than about 50 and including tungsten carbide, chromium carbide and bi-metallic chromium tungsten carbide crystals consisting essentially of from about 12% to about 20% tungsten, from about 13% to about 30% chromium, an effective amount of carbon for forming carbides with the tungsten and chromium, from about 2% to about 5% iron, from about 2% to about 5% boron and from about 2% to about 5% silicon, with the balance being nickel wherein chromium and tungsten are present in a ratio of from 0.65:1 to 1.4:1, wherein said alloy includes precipitated carbides of chromium, tungsten and bimetallic tungsten chromium carbides having a size of from about 25 to about 100 microns interspersed therethrough and metallurgically bonded therein, and wherein said alloy has a porosity which when coated on a substrate is not visible at a magnification of ten times.

2. The hard surfacing alloy of claim 1 having a 35% to 50% population of tungsten carbides and chromium carbides in its surface area.

3. The hard surfacing alloy of claim 2 wherein about 10% to about 15% of said alloy includes tungsten and chromium carbides in its surface area.

4. The hard surfacing alloy of claim 1 wherein the effective amount of carbon is from about 0.5% to about 1%.

5. A process of manufacture of a high temperature resistant and corrosion resistant alloy having precipitated bi-metallic chromium tungsten carbides, chromium carbides and tungsten carbides comprising the steps of:

a) formulating a melt of from about 12% to about 20% tungsten, from about 13% to about 30% chromium, an effective amount of carbon for forming carbides with the tungsten and chromium and bi-metallic carbides, from about 2% to about 5% iron, from about 2% to about 5% boron, from about 2% to about 5% silicon, and the balance being nickel wherein chromium and tungsten are present in a ratio of from 0.65:1 to 1.4:1;

b) raising the melt of step (a) to a temperature of greater than 2500° F.; and c) atomizing the melt with rapid solidification wherein a powdered alloy containing precipitated tungsten carbides, chromium carbides and bi-metallic tungsten and chromium carbides having a size of from about 25 to about 100 microns is produced.

6. The process of claim 5 wherein the mixture is raised to a temperature of about 2800° F. to about 3000° F. prior to atomization.

7. The process of claim 5 wherein an addition of from about 2% to about 5% silicon to the melt of step (b) immediately prior to atomization.

8. The process of claim 5 wherein the carbon constituent is provided in ranges of from about 0.5% to about 1%.

* * * * *